June 9, 1953  A. C. PETERS  2,641,748
SOLDERING LUG
Filed May 10, 1949
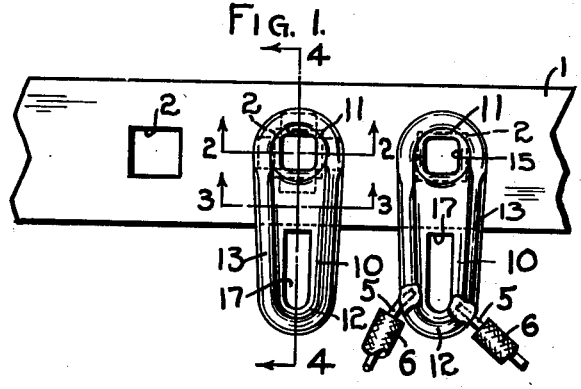
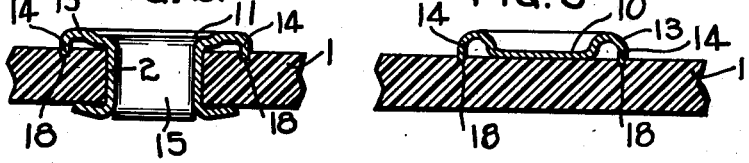
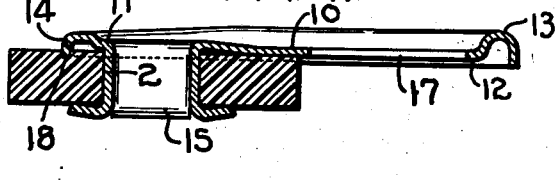
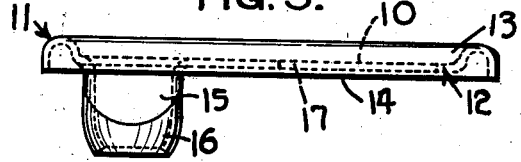
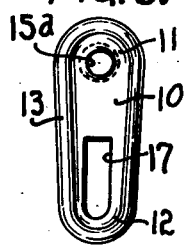
INVENTOR:
ARTHUR C. PETERS,
BY Philip E. Parker
ATTORNEY.

Patented June 9, 1953

2,641,748

UNITED STATES PATENT OFFICE 2,641,748

SOLDERING LUG

Arthur C. Peters, Midlothian, Ill., assignor to Cinch Manufacturing Corporation, Chicago, Ill., a corporation of Illinois Application May 10, 1949, Serial No. 92,263

2 Claims. (Cl. 339—277)

The present invention relates to soldering lugs of the type adapted to be secured to a supporting panel and to which a plurality of electrical conductors may be soldered in electrical connection, and the invention aims generally to improve existing lugs of that type.

A primary object of the invention is the provision of an improved soldering lug that is of simple construction, inexpensive in cost of manufacture, and which will provide a strong support for soldered connection of a plurality of conductors.

A further object of the invention is the provision of an improved soldering lug formed of such thin sheet metal as to be quickly heated substantially simultaneously to the melting temperature of the soldering alloy with the result that the electrical connection with a soldered conductor is materially improved.

The above and other objects of the invention will be apparent to persons skilled in the art from a consideration of the accompanying drawings and annexed specification illustrating and describing preferred embodiments of the invention.

In the drawings:

Fig. 1 is a plan view of a portion of a soldering lug-supporting strip with a pair of lugs attached thereto;

Fig. 2 is an enlarged transverse sectional view as taken on the line 2—2 of Fig. 1;

Fig. 3 is an enlarged transverse sectional view as taken on the line 3—3 of Fig. 1;

Fig. 4 is an enlarged longitudinal sectional view as taken on the line 4—4 of Fig. 1;

Fig. 5 is an enlarged side elevation of my improved lug; and

Fig. 6 is a plan view of the improved lug illustrating a modified form of attaching eyelet.

Referring further to the drawings, the soldering lug of the present invention is preferably an elongated body 10 formed of very thin sheet metal having adjacent opposite ends, a head portion 11, and a tail portion 12, the body 10 being encompassed by a continuous peripheral substantially semi-circular rim or bead 13 presenting a free downwardly turned peripheral edge 14.

It is customary in the art to mount a plurality of soldering lugs in rows upon a supporting strip or panel 1 of suitable insulating material, for example a body of phenolic condensation product. Such panels are normally provided with a series of apertures 2 for the reception of suitable attaching means and in many instances the apertures are of square shape as illustrated in Fig. 1.

The head portion 11 of the improved lug of the present invention is provided with integral attaching means, preferably in the form of a tubular eyelet 15, drawn from the body of the lug and from within the arcuate peripheral rim 13 of the head; so as to extend perpendicularly to the plane of the body 10 in a direction toward and beyond the free downturned peripheral edge 14. The tubular eyelet 15 may be of desired cross sectional shape, for example square, as shown in Figs. 1 to 5, or of circular shape as shown at 15ᵃ in Fig. 6, and is of suitable length to extend through and provide an upsettable portion 16 adapted to be upset by a suitable punch and die and clinched against an opposite face of the support 1 to securely attach the lug thereto. Preferably the length of the attaching eyelet 15 is substantially greater than the diameter or the transverse dimension thereof.

The tail portion 12 of the lug, which normally projects laterally beyond the edge of the support 1 when the lug is attached thereto, may be apertured as at 17 to provide a ring-like tail around which the cores 5 of a plurality of electrical conductors 6 may be turned to preliminarily attach the conductors to the lug prior to soldering. For this purpose most of the body of the lug within the convexed semi-circular bead or rim 13 is cut or stamped out of the tail portion 12 providing an elongated loop for the reception of a maximum number of conductor cores for a given length of tail portion. The fact that the supporting walls of the tail are of convexed semi-circular construction a sufficient amount of conductive metal for maintaining good electrical conduction between the several conductors is provided.

It will be apparent that the lug may be attached to a support 1 which has been preformed with a series of apertures 2. The tubular eyelet portion 15 is inserted through the aperture 2 and the protruding end portion 16 is upset against the opposite or under face of the support 1 to securely fasten the lug in place on the support. The upsetting pressure, which conveniently may be by any suitable punch and die (not shown) causes the free edges 14 of the pehipheral bead 13 to bite into the material of the support 1, as shown at 18, and assists in preventing turning of the lug with reference to the support about the axis of the eyelet 15. This biting edge provides an interlock between the lug and the support 1 which materially contributes to the rigidity of the mounted lug.

As stated above, the lug is formed or stamped from thin sheet metal. The thin sheet metal possesses the advantage of being quickly heated locally to the approximate melting temperature of the soldering alloy with the result that a more perfect soldered connection, from the standpoint of electrical conductivity, is provided, than in the case of lugs of greater thickness.

Thus, by means of the present invention, I am able to provide a lug constructed of such thin sheet metal as to effect a better soldered electrical connection while providing adequate strength against bending and distortion as well as rigidity of mounting.

Although I have illustrated and described a preferred embodiment of the invention, I do not intend to be restricted thereto as the scope of the invention is best defined in the appended claims.

I claim:

1. A soldering lug for electrically connecting a plurality of electrical conductors comprising an elongated body of thin sheet metal having opposite head and tail portions and provided with a peripheral convexed rim, an integral tubular eyelet drawn from said head portion and extending perpendicularly thereto, and provided with an upsettable terminal end portion for securing said lug to a support, the outer peripheral edge of said convexed rim being downturned below the plane of said body to provide a support biting edge, and said tail portion being apertured between opposite side portions of said convexed rim and providing a conductor-receiving loop.

2. A soldering lug for electrically connecting a plurality of electrical conductors to be soldered thereto, comprising an elongated stamping of thin sheet metal providing longitudinally spaced head and tail portions, a continuous convexed bead of substantially semi-circular cross section extending around said head and tail portions and providing an outer downturned peripheral edge of sufficient thinness and projecting below the plane of the lug to constitute a support biting edge around said head portion, an integral tubular attaching eyelet joined with the body of said head portion within said convexed rim portion and extending perpendicularly to said head portion for a substantial distance past said biting edge, said eyelet having an upsettable terminal end portion adapted to be upset over a face of a support for securing said lug thereto and said tail portion being apertured between opposite side portions of the convexed rim thereof to provide a looped opening for receiving a plurality of conductor cores to be soldered thereto.

ARTHUR C. PETERS.

References Cited in the file of this patent

UNITED STATES PATENTS

| Number | Name | Date |
|---|---|---|
| 1,297,560 | Groenenstein | Mar. 18, 1919 |
| 1,729,873 | Hengstenberg | Oct. 1, 1929 |
| 1,912,653 | Olson | June 6, 1933 |
| 2,073,466 | Del Camp | Mar. 9, 1937 |
| 2,127,050 | Smith | Aug. 16, 1938 |
| 2,350,887 | Goff | June 6, 1944 |
| 2,430,091 | Wallace | Nov. 4, 1947 |